(12) United States Patent
Dilley et al.

(10) Patent No.: US 7,798,549 B2
(45) Date of Patent: Sep. 21, 2010

(54) TRUNK LINER METHOD AND APPARATUS

(75) Inventors: Jason Dilley, Marysville, OH (US);
Ryan Larcom, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/261,371

(22) Filed: Oct. 30, 2008

(65) Prior Publication Data

US 2010/0109366 A1    May 6, 2010

(51) Int. Cl.
*B60R 13/01* (2006.01)
(52) U.S. Cl. .................................... 296/39.1
(58) Field of Classification Search ............... 296/39.1, 296/39.2
See application file for complete search history.

(56) References Cited

U.S. PATENT DOCUMENTS

| | | | |
|---|---|---|---|
| 4,673,207 A | 6/1987 | Reynolds et al. | |
| 4,801,169 A | 1/1989 | Queen et al. | |
| 4,917,431 A | 4/1990 | McDonald | |
| 5,626,380 A | 5/1997 | Elson et al. | |
| 5,979,962 A | 11/1999 | Valentin et al. | |
| 6,155,624 A | 12/2000 | Bienenstein, Jr. | |
| 6,237,980 B1 * | 5/2001 | Miles et al. | 296/39.2 |
| 6,290,278 B1 | 9/2001 | Loveland | |
| 7,201,421 B2 | 4/2007 | Reynolds et al. | |
| 7,698,817 B2 | 4/2010 | Khambete et al. | |
| 2006/0170237 A1 * | 8/2006 | McAuliffe, Jr. | 296/39.1 |
| 2006/0182935 A1 | 8/2006 | Tompson et al. | |
| 2006/0208378 A1 | 9/2006 | Khambete et al. | |
| 2006/0208379 A1 | 9/2006 | Khambete et al. | |
| 2007/0151658 A1 | 7/2007 | Khambete et al. | |

FOREIGN PATENT DOCUMENTS

| | | |
|---|---|---|
| EP | 0266024 A1 | 5/1988 |
| EP | 0266024 B1 | 10/1991 |
| EP | 0760756 | 9/1998 |
| EP | 1606087 | 12/2005 |
| EP | 1606100 | 12/2005 |
| JP | 63097446 | 4/1988 |
| JP | 03106248 | 5/1991 |
| JP | 07027979 | 1/1995 |
| JP | 07055646 | 3/1995 |
| JP | 2006519729 | 8/2006 |

(Continued)

OTHER PUBLICATIONS

Korean Intellectual Property Office, International Search Report, May 19, 2010, 3 pages.

(Continued)

*Primary Examiner*—Joseph D Pape
(74) *Attorney, Agent, or Firm*—Mark E. Duell, Esq.; Emerson Thomson Bennett (57) ABSTRACT

A trunk compartment may include a trunk lining having a trunk top coat member and a trunk spacer member. The trunk coat top member may have an inner surface that may define a portion of the trunk lining and an outer surface. A trunk spacer member may be operatively connected to the trunk coat top member and the vehicle frame. The trunk coat top member and the trunk spacer member may be formed in the same mold.

20 Claims, 11 Drawing Sheets

FOREIGN PATENT DOCUMENTS

| | | |
|---|---|---|
| JP | 2006523573 | 10/2006 |
| KR | 1019910001410 B1 | 3/1991 |
| KR | 100243935 | 3/2000 |
| WO | WO9534446 A1 | 12/1995 |
| WO | WO2004/080710 A2 | 9/2004 |
| WO | WO2004/080710 A3 | 9/2004 |
| WO | WO2004/080749 A2 | 9/2004 |
| WO | WO2004/080749 A3 | 9/2004 |
| WO | WO2004/080762 A2 | 9/2004 |
| WO | WO2004/080762 A3 | 9/2004 |
| WO | WO2004/080763 A2 | 9/2004 |
| WO | WO2004/080763 A3 | 9/2004 |

OTHER PUBLICATIONS

Korean Intellectual Property Office, Written Opinion, May 19, 2010, 4 pages.

* cited by examiner

TRUNK LINER METHOD AND APPARATUS

I. BACKGROUND OF THE INVENTION

A. Field of Invention

The present invention generally relates to motor vehicles and more specifically relates to trunk liner components used in motor vehicles and related methods of manufacturing and installing trunk liner components.

B. Description of the Related Art

It is known in the art for passenger vehicles to have a storage compartment, often referred to as a trunk. It is also known in the art for a trunk to have a lining covering the frame. This trunk lining makes the trunk more useable and provides a better appearance for the consumer.

In a known construction, a trunk lining consists of a top coat, covering the frame and visible to the consumer, and a spacer placed between the top coat and the frame. The top coat and spacer may be formed of the same material or from different materials. The top coat and spacer are formed in different molds and then affixed in a later process. This causes an extra investment of two separate molds and excess scrap material.

Although many known methods work well for their intended purpose, several disadvantages exist. One known disadvantage is that two separate molds must be used to create the trunk liner. Another known disadvantage is the excess scrap from using two different molds to create the trunk liner.

Therefore, what is needed is apparatuses and methods for creating a trunk liner in a single mold to reduce manufacturing costs and excess scrap.

II. SUMMARY OF THE INVENTION

According to one embodiment of this invention, a vehicle comprises a frame, a vehicle body supported to the frame and further defining a locomotion compartment, a passenger compartment for use in housing associated passengers, and a trunk compartment for use in housing cargo, a locomotion source supported to the frame and positioned substantially within the locomotion compartment, at least one ground engaging wheel supported to the frame and operatively connected to the locomotion source to provide locomotion for the vehicle. The trunk compartment may include a trunk lining which may comprise a first trunk top coat member having an inner surface that defines at least a portion of the trunk lining and an outer surface, and a first trunk spacer member wherein a first portion of the first trunk spacer member is operatively connected to the first trunk top coat member and a second portion is operatively connected to the trunk compartment. The first trunk top coat member and the first trunk spacer member may be formed in the same mold. The trunk compartment may be positioned outside the passenger compartment.

According to another embodiment of this invention, a method comprises the steps of: (A) molding a first trunk top coat member and a first trunk spacer member in the same mold, wherein the first trunk top coat member has an inner surface and an outer surface and the first trunk spacer member has a first portion and a second potion; and (B) assembling a trunk lining by operatively connecting the first portion of the first trunk top spacer to the first trunk top coat member and operatively connecting the second portion of the first trunk spacer to an associated trunk compartment.

One advantage of this invention is that it reduces the number of molds required to produce the trunk liner.

Another advantage of this invention is that the amount of scrap created in the molding process of trunk liners is reduced.

Other benefits and advantages of this invention will become apparent to those skilled in the art to which it pertains upon reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

IV. DETAILED DESCRIPTION OF THE INVENTION

Referring now to the drawings wherein the showings are for purposes of illustrating embodiments of the invention only and not for purposes of limiting the same, and wherein like reference numerals are understood to refer to like components, FIGS. 1-4 show a vehicle 30 having a storage compartment or trunk 50 equipped with a trunk lining 10 according to one embodiment of this invention. While the vehicle 30 shown is an automobile, it is to be understood that the trunk lining 10 of this invention will work well with any vehicle including, but not limited to, cars, trucks, sport utility vehicles, cross-over vehicles, motorcycles, off-road vehicles, all-terrain vehicles, and airplanes as well as other passenger carrying devices such as boats. This invention may also work well in non-vehicle applications.

With continuing reference to FIGS. 1-4, the vehicle 30 may include a frame 32 and a body 40 that is supported to the frame 32 and that defines a passenger compartment 42 for housing passengers as is well known in the art, a locomotion compartment 36, and a storage compartment or trunk 50. The vehicle 30 may also include a locomotion source 34 mounted to the frame 32 and positioned substantially within the locomotion compartment 36. The locomotion source 34 may be of any type chosen with the sound judgment of a person of skill in the art including, for some non-limiting examples, an internal combustion engine (ICE), an electric motor, and so called "hybrids" which combine an ICE with an electric motor. The vehicle 30 may also have one or more ground engaging wheels 44 for uses well known in the art such as steering and transferring power from the locomotion source 34 to provide locomotion for the vehicle 30.

Figure 1:
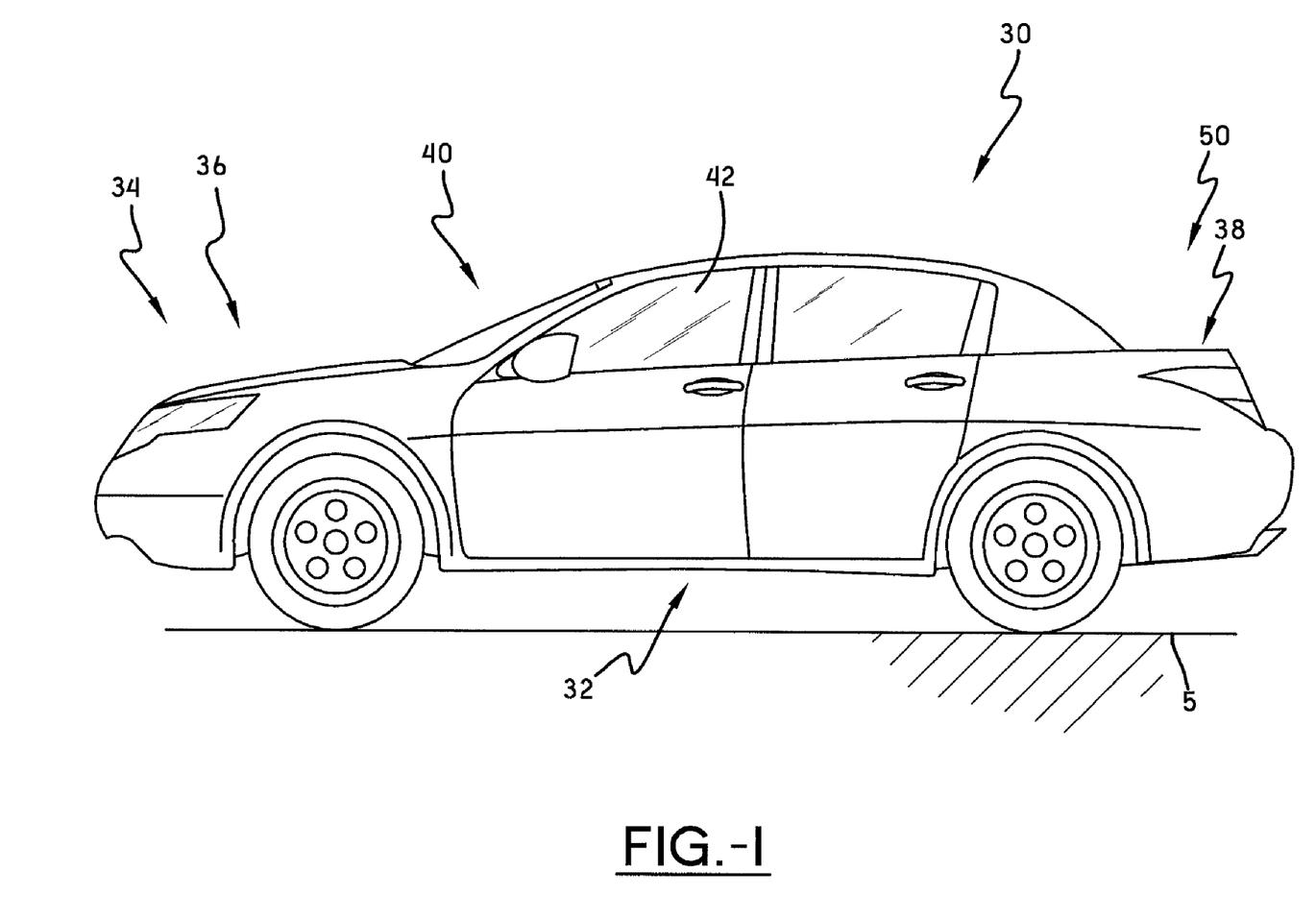
FIG. 1 is a side view of a vehicle equipped with a trunk lining according to one embodiment of this invention.
Figure 2:
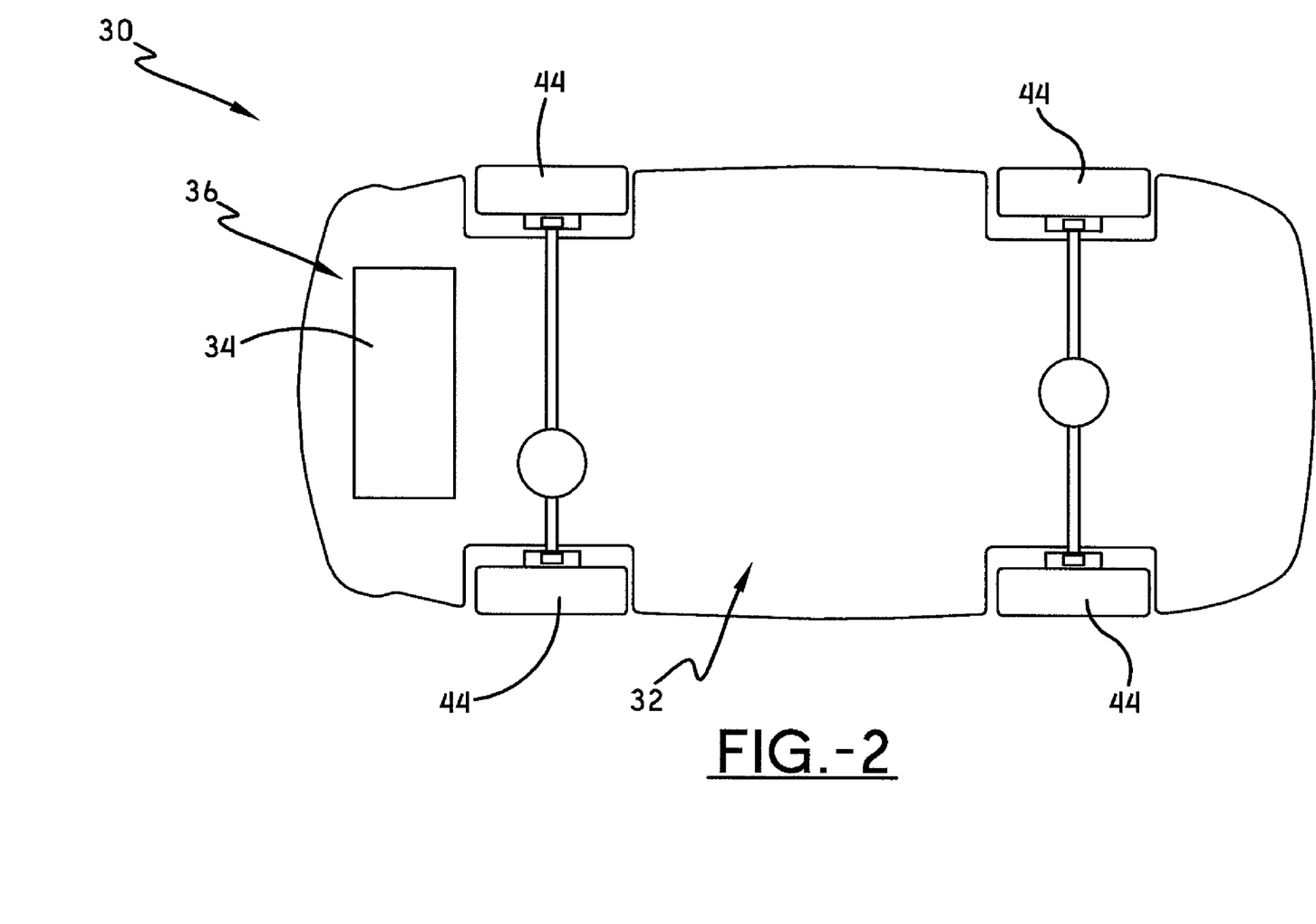
FIG. 2 is a schematic bottom view of the vehicle shown in FIG. 1.
Figure 3:
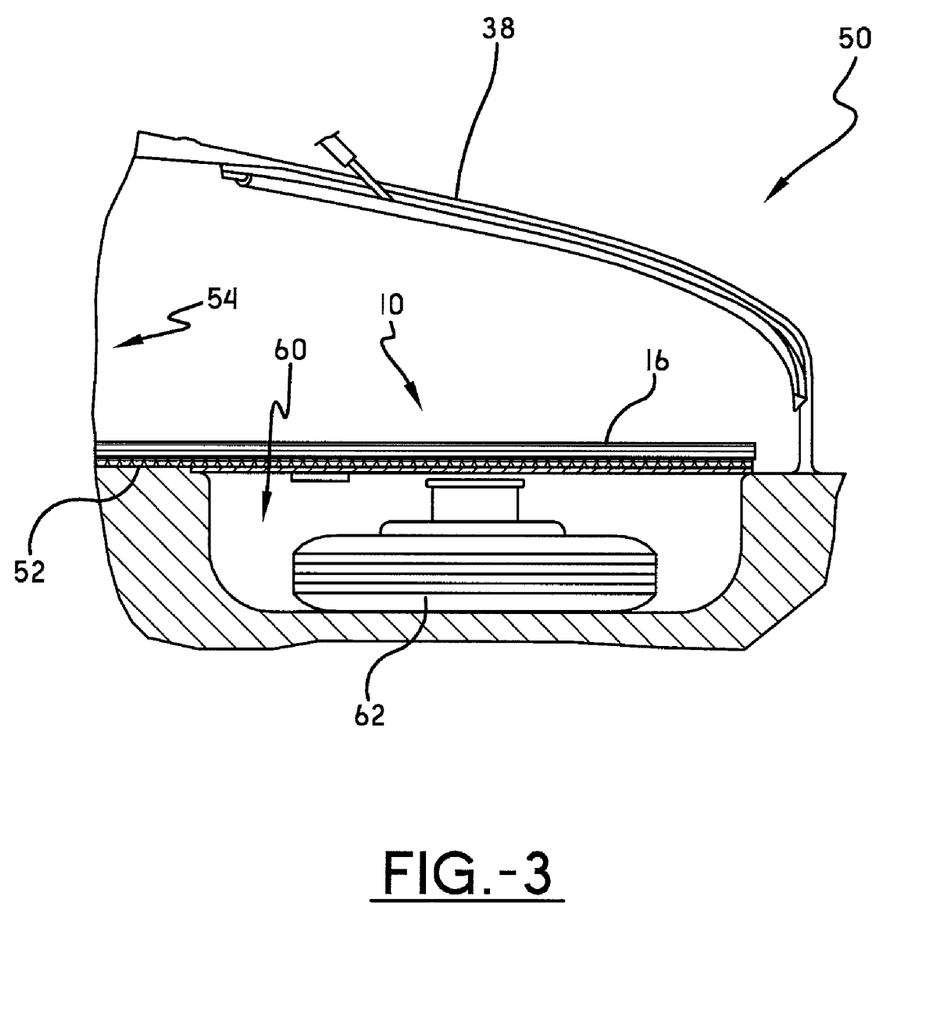
FIG. 3 is a sectional side view of the trunk of the vehicle shown in FIG. 1.
Figure 4:
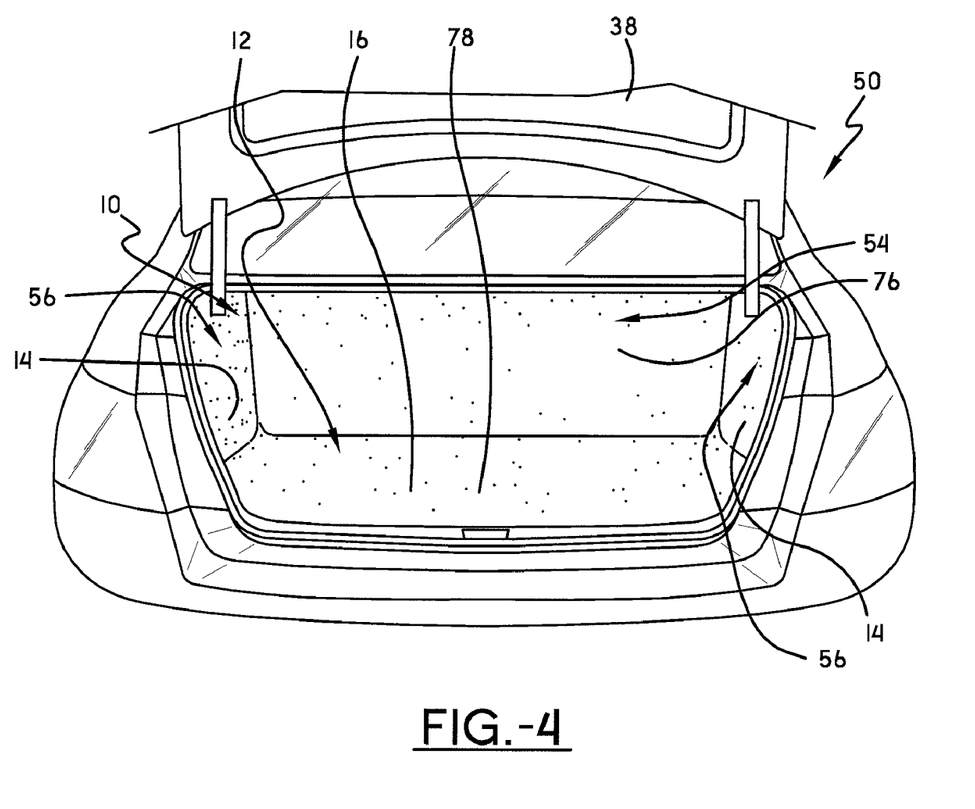
FIG. 4 is a back view of the vehicle shown in FIG. 1 with the trunk lid opened.

With continuing reference to FIGS. 1-4, the trunk 50 may be used, as is well known in the art, to hold and transport cargo. The trunk 50 may have an optional trunk lid 38 that may be closed to protect the cargo and opened to permit the cargo to be loaded into and unloaded from the trunk 50, as is also well known in the art. While the trunk 50 shown is positioned at the rear of the vehicle 30, it should be understood that the location of the trunk 50 may be any chosen with the sound judgment of a person of skill in the art. Trunk 50 may include a trunk floor 52 that is substantially horizontal or parallel to ground 5. The floor 52 of trunk 50 may have a spare tire well 60 for receiving a spare tire 62. The spare tire well 60 may be recessed below the trunk floor 52, as shown in FIG. 4. Trunk 50 may also include a front border 54 and two side borders 56, 56. The trunk shape, as observed by one using the trunk 50, may be substantially defined by the trunk lining 10. The trunk lining 10 may cover substantially the entire trunk 50 including floor 52, front border 54, and side borders 56, 56. The trunk lining 10 may be formed as substantially one continuous piece or in two or more sections. The trunk lining 10 may also include insulation (not shown) and carpet, fabric, or other covering 16 to provide better aesthetics and usability. For the exemplary but non-limiting embodiment shown, trunk lining 10 includes a front trunk lining assembly 12 and a pair of side trunk lining assemblies 14, 14.

Figure 5:
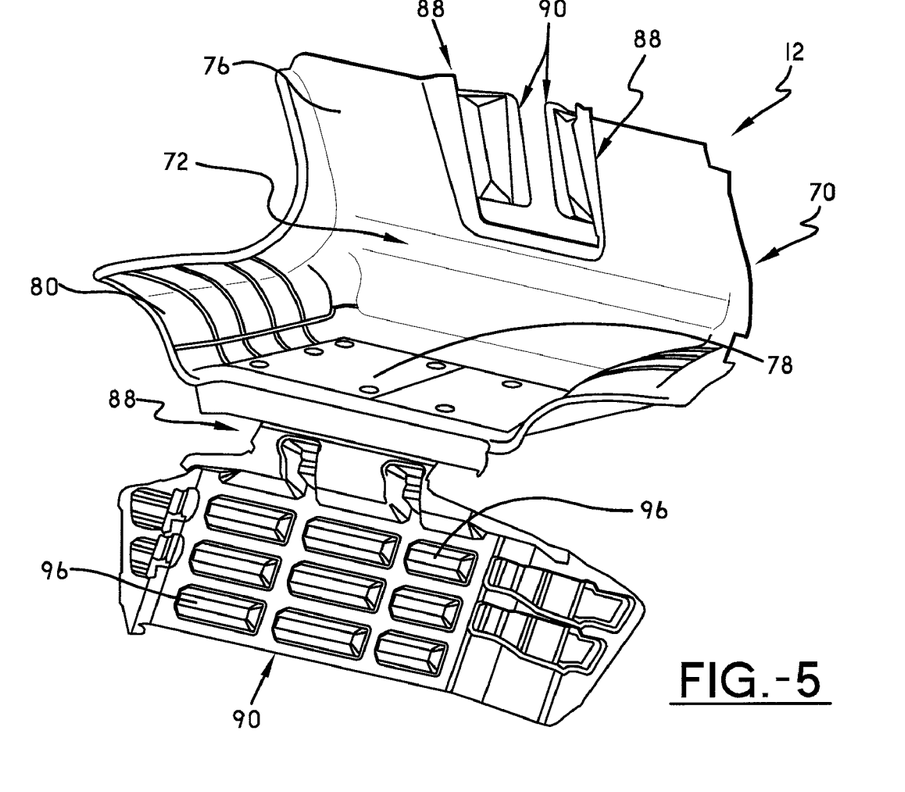
FIG. 5 is a perspective view of a front trunk lining assembly according to one embodiment of this invention shown in the formed shape.
Figure 6:
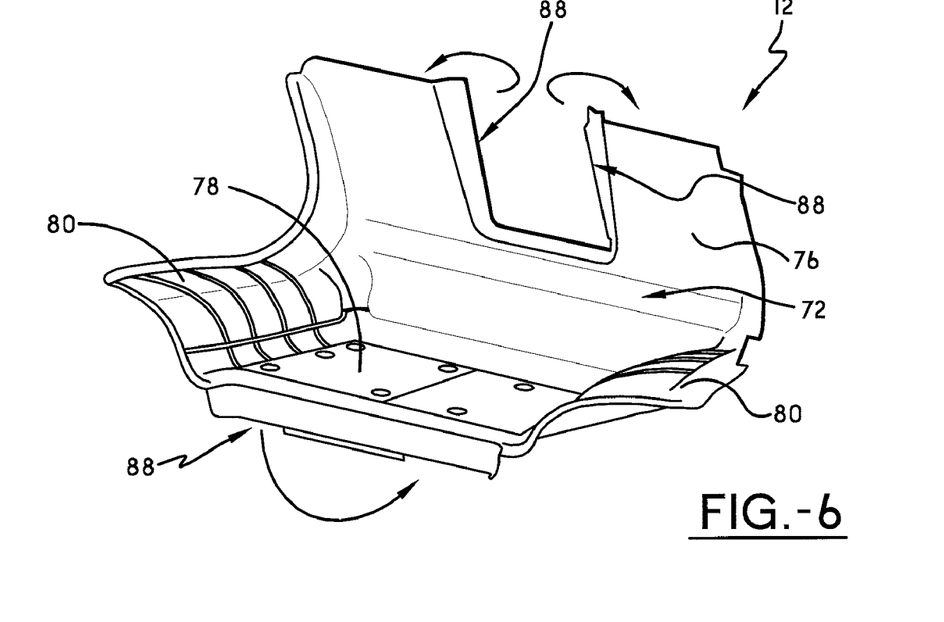
FIG. 6 is a perspective view of the front trunk lining assembly in FIG. 5, but shown in the assembled shape.
Figure 7:
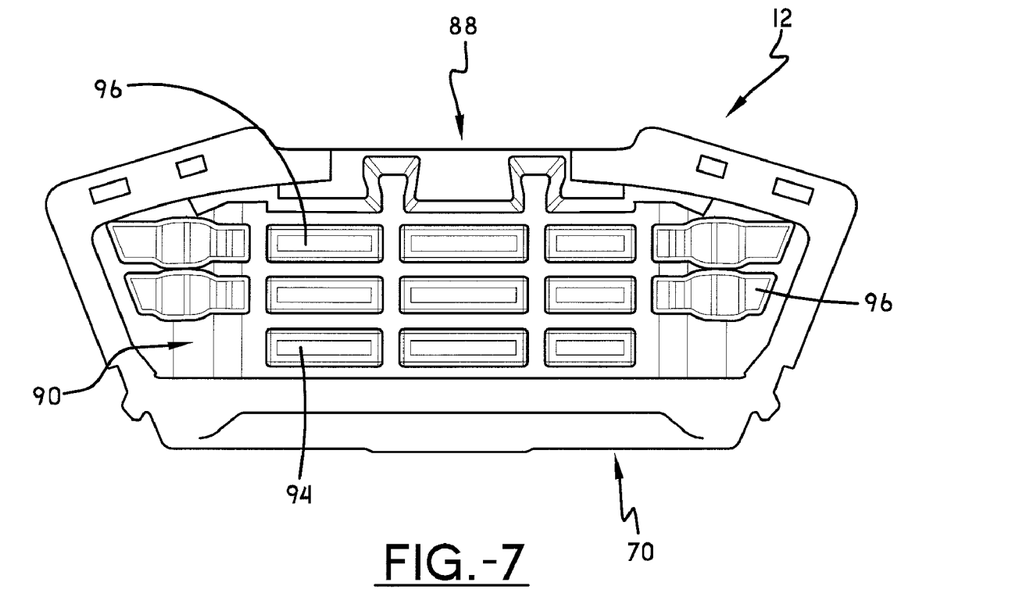
FIG. 7 is a bottom view of the front trunk lining assembly shown in FIG. 6.
Figure 8:
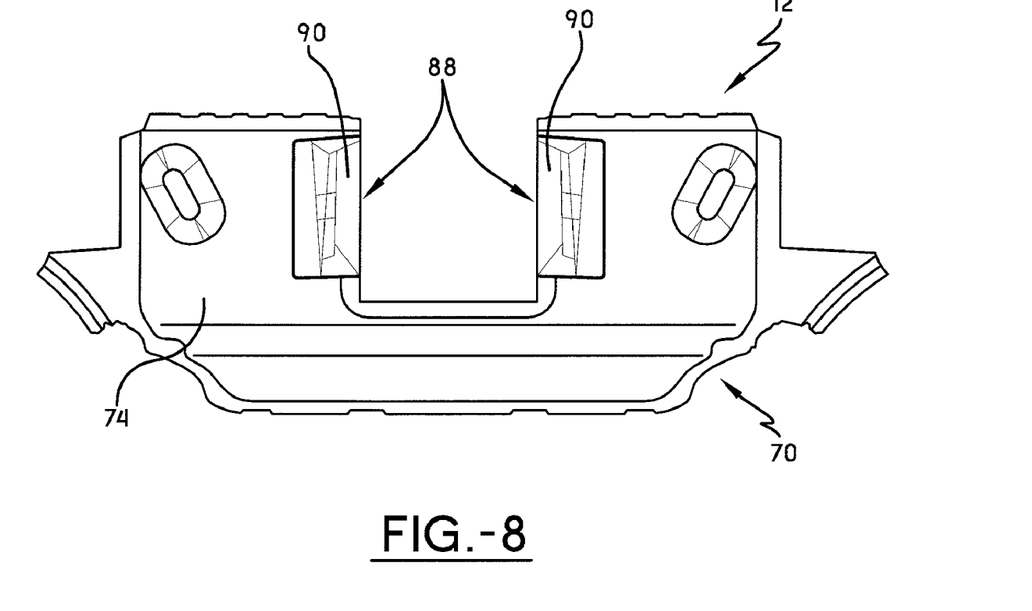
FIG. 8 is a back view of the front trunk lining assembly shown in FIG. 6.

With reference now to FIGS. 4-10, the front trunk lining assembly 12 will now be described. The front trunk lining assembly 12 may have at least two types or portions, a top coat 70 and a spacer 90. Top coat 70 may have an inner surface 72 and an outer surface 74. Inner surface 72 may include covering 16. Top coat 70 may have the general shape of at least of portion of trunk 50 or any shape chosen with the sound judgment of a person of skill in the art. Spacer 90 may have a first portion 92 and a second portion 94. Spacer 90 may have any shape chosen with the sound judgment of a person of skill in the art. In one embodiment, spacer 90 has at least one ridge 96. In another embodiment, spacer 90 has a plurality of ridges 96. Ridge 96 may be a raised elevated portion in spacer 90 for providing a surface to operatively connect to either trunk 50 and/or top coat 70. Ridge 96 may also provide structural support and/or rigidity to spacer 90. Ridge 96 may have a corrugated, ribbed, grooved, or any other shape chosen with the sound judgment of a person of skill in the art. Top coat 70 and spacer 90 may be formed as different members in the same die or mold 200. In one embodiment, top coat 70 and spacer 90 are formed as substantially one continuous member. Top coat 70 and spacer 90 may be operatively connected by hinge 88, allowing spacer 90 to move relative to top coat 70. The particular hinge 88 used may be of any type chosen with the sound judgment of a person of skill in the art. The hinge 88, for example, may be of the type known as a living hinge. Top coat 70, spacer 90, and hinge 88 may all be molded from the same or different material. In one embodiment, front trunk lining assembly 12 may have one top coat 70 operatively connected to two spacers 90, 90. In a more specific embodiment, front trunk lining assembly 12 may have three spacers 90, 90, 90, in which each spacer 90 is connected to a single top coat 70 with a hinge 88, as shown in FIG. 5. The first spacer 90 is connected to the top coat 70 with a first hinge 88, the second spacer 90 is connected to the top coat 70 with a second hinge 88, and the third spacer 90 is connected to the top coat 70 with a third hinge 88.

Figure 9:
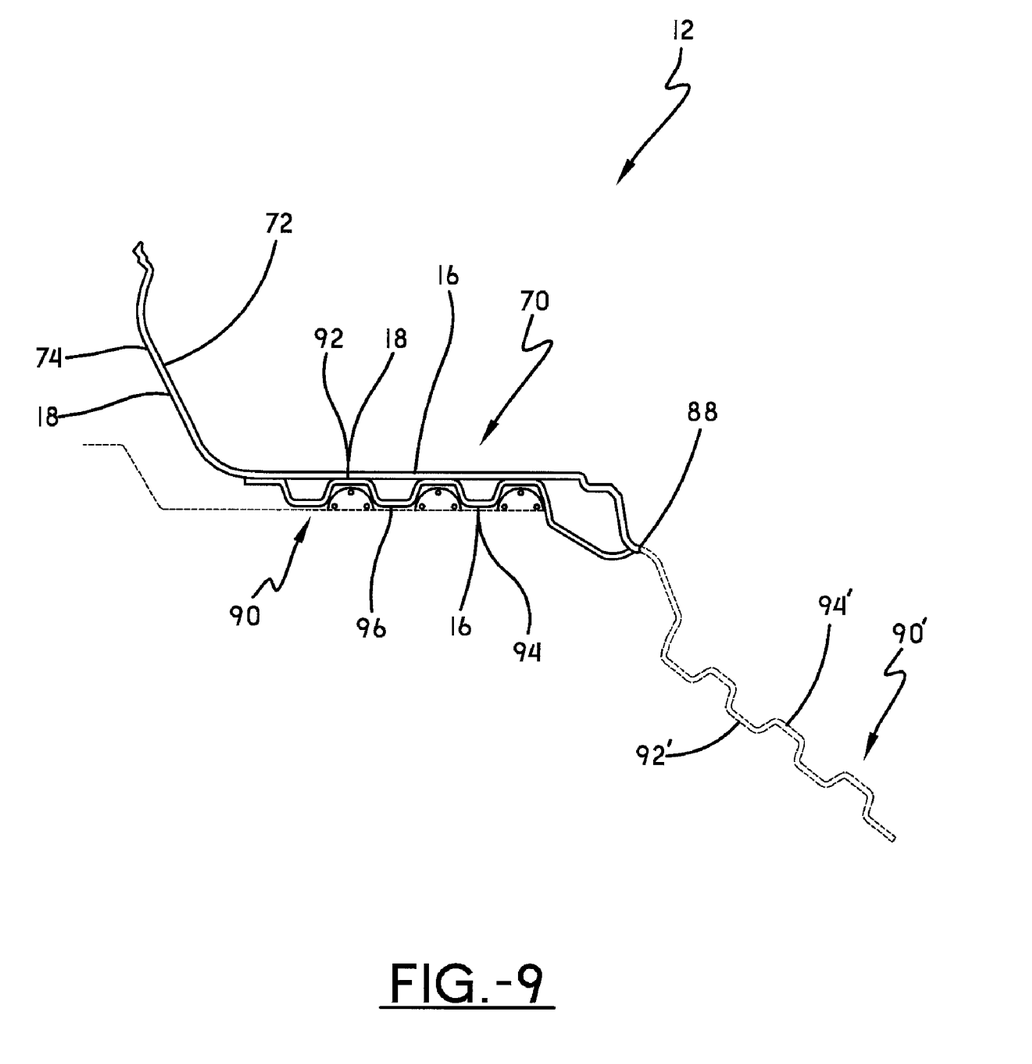
FIG. 9 is a schematic side view of the front trunk lining assembly showing both the formed shape and the assembled shape.
Figure 10:
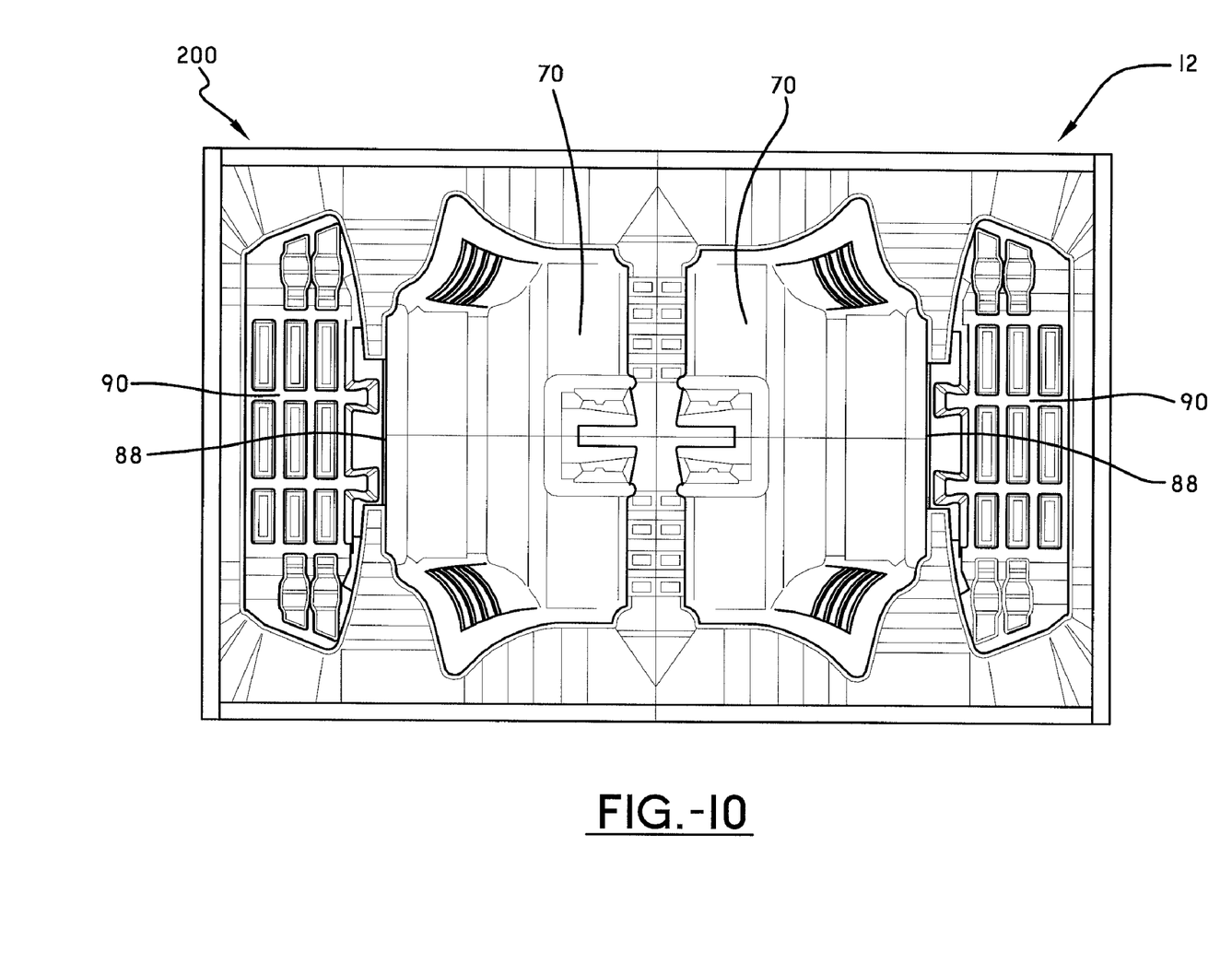
FIG. 10 is a top view of a mold used to make a front trunk lining assembly according to one embodiment.

With continuing reference to FIGS. 4-10, after front trunk lining assembly 12 is formed, spacer 90' may have first portion 92' and second portion 94' in the unassembled position as shown in FIG. 9. Spacer 90 is then moved about hinge 88 to operatively connect first portion 92 to outer surface 74. First portion 92 and outer surface 74 may be operatively connected by ultrasonic welding or any other method chosen with the sound judgment of a person of skill in the art. When lining assembly 12 is installed in trunk 50, spacer 90 is located between outer surface 74 and frame 32. After installation, first portion 92 is operatively connected to outer surface 74 and second portion 94 is operatively connected to trunk 50. In one embodiment, top coat 70 is visible and spacer 90 is not visible to someone utilizing trunk 50. At least a portion of inner surface 72 may be in contact with any cargo located within the trunk 50. In one embodiment, front trunk lining assembly 12 may have a front portion 76, a floor portion 78, and a side portion 80. Front portion 76 may operatively connect to at least a portion of front border 54 of trunk 50, floor portion 78 may operatively connect to at least a portion of trunk floor 52 of trunk 50, and side portion 80 may operatively connect to at least a portion of side border 56 of trunk 50.

Figure 11:
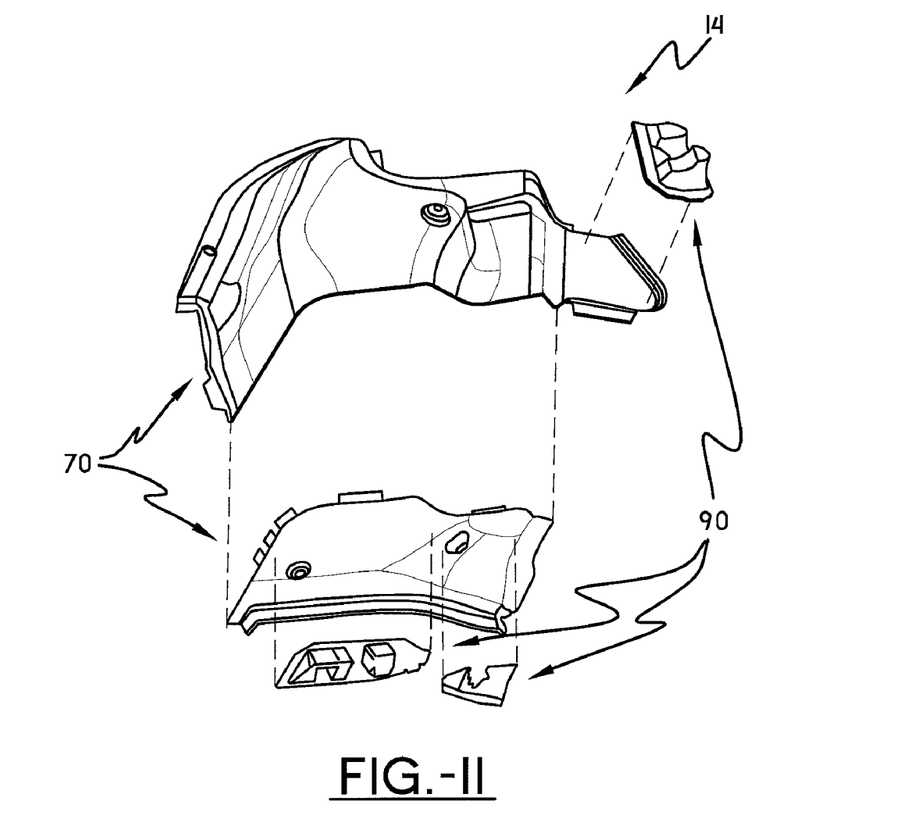
FIG. 11 is a perspective view of a side trunk lining assembly according to one embodiment of this invention shown in the formed shape.
Figure 12:
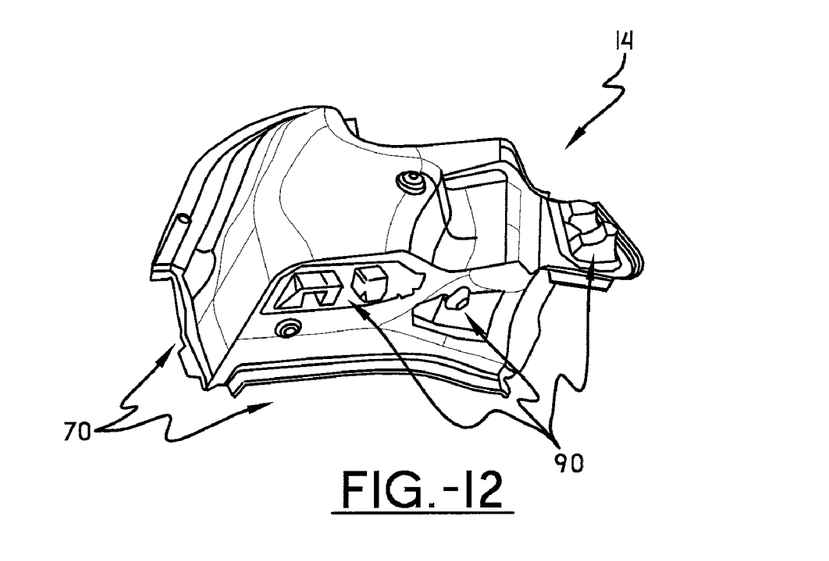
FIG. 12 is a perspective view of the side trunk lining assembly in FIG. 11, but shown in the assembled shape.

With reference now to FIGS. 11-14, the side trunk lining assembly 14 will now be described. The side trunk lining assembly 14 may have at least two types or portions, a top coat 70 and a spacer 90. Top coat 70 may have an inner surface 72 and an outer surface 74. Top coat 70 may be formed from several members or may be one continuous member. Spacer 90 may have a first portion 92 and a second portion 94. In one embodiment, top coat 70 and spacer 90 are formed in the same die or mold 200. Top coat 70 and spacer 90 may be molded from the same or different material. In one embodiment, side trunk lining assembly 14 may have two top coats 70, 70 operatively connected to each other with each top coat 70 operatively connected to one spacer 90. In a more specific embodiment, side trunk lining assembly 14 may have two top coats 70, 70 and three spacers 90, 90, 90, as shown in FIG. 11. The two top coats 70, 70 may be operatively connected to each other. One top coat 70 may operatively connect to two spacers 90, 90, and the second top coat 70 may operatively connect to the third spacer 90.

Figure 13:
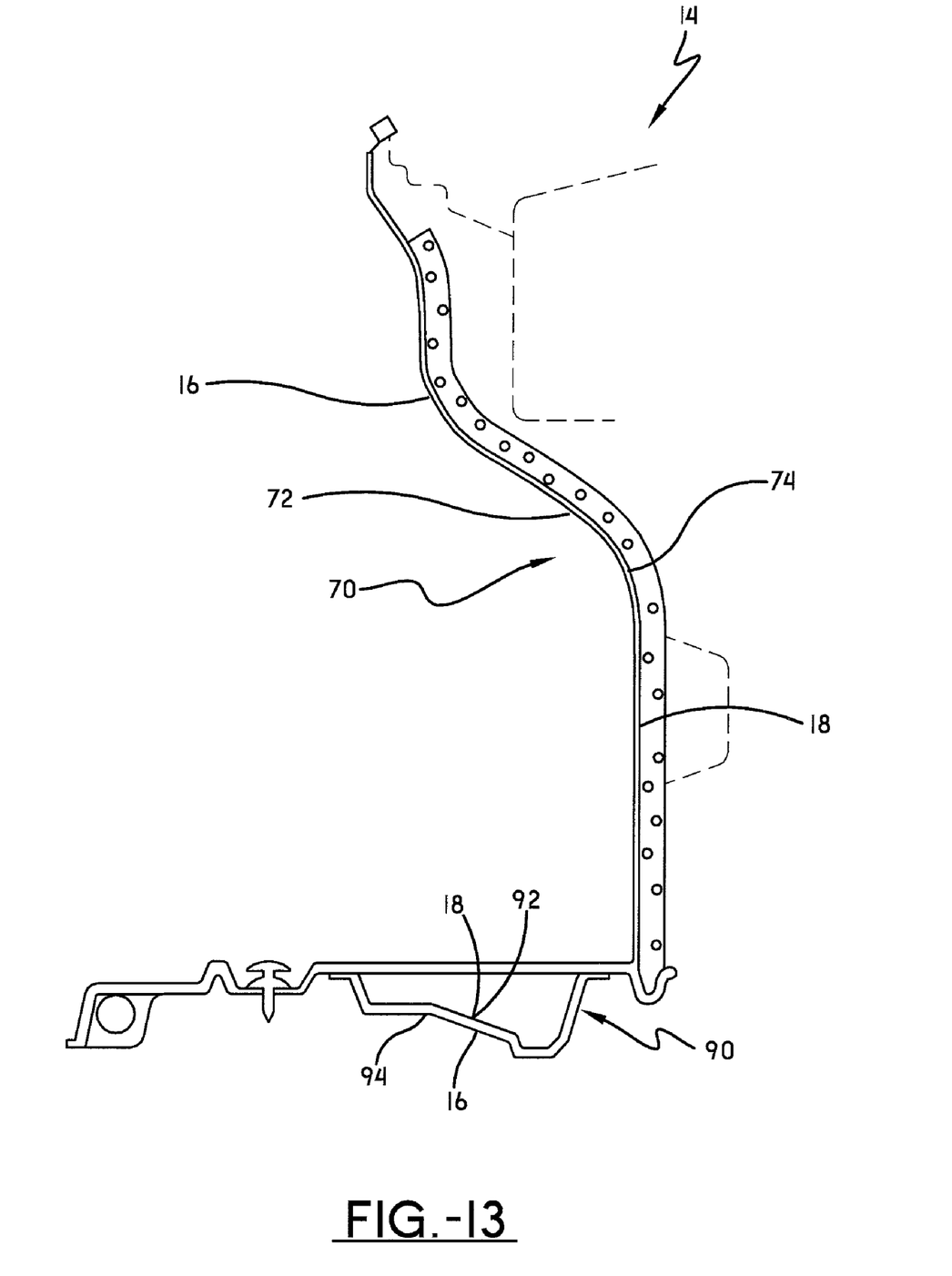
FIG. 13 is a schematic side view of the side trunk lining assembly showing both the formed shape and the assembled shape.
Figure 14:
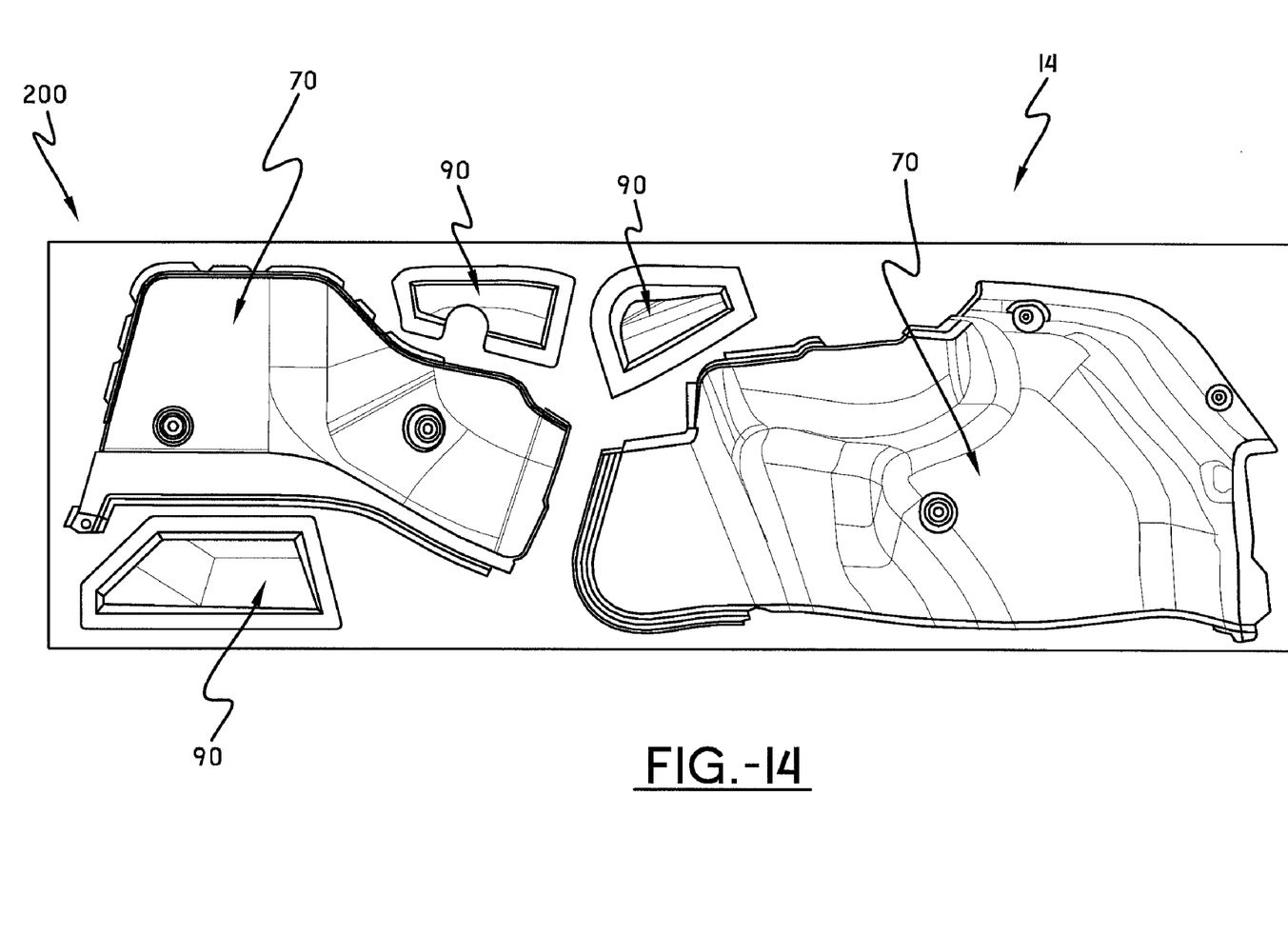
FIG. 14 is a top view of a mold used to make a side trunk lining assembly according to one embodiment.

With continuing reference to FIGS. 11-14, after side trunk lining assembly 14 is formed, first portion 92 of spacer 90 may be operatively connected to outer surface 74, as shown in FIG. 13. First portion 92 and outer surface 74 may be operatively connected by ultrasonic welding or any other method chosen with sound judgment of a person of skill in the art. When side trunk lining assembly 14 is installed in trunk 50, spacer 90 is located between outer surface 74 and frame 32. After installation, first portion 92 is operatively connected to outer surface 74 and second portion 94 is operatively connected to trunk 50. In one embodiment, top coat 70 is visible and spacer 90 is not visible to someone utilizing trunk 50. At least a portion of inner surface 72 could be in contact with any cargo located within the trunk 50. In one embodiment, side trunk lining assembly 14 may operatively connect to at least a portion of trunk floor 52 and at least a portion of side border 56 of trunk 50.

With reference now to all the FIGURES, a process to form the trunk lining 10 will now be described. In one embodiment, the trunk lining 10 may consist of two layers. The first layer may be the fabric or covering 16 and may form the inner surface 72 of the topcoat 70. The fabric or covering 16 may also form the second portion 94 of the spacer 90. The second layer 18 may be a plastic which is laminated, extruded, or otherwise adhered to the back side of the covering 16 to form the outer surface 74 of the topcoat 70 and the first portion 92 of the spacer 90. In one embodiment, the covering 16 may initially be in a sheet or roll form, and a hot plastic is laminated or extruded onto the back side of the covering 16 to form this second layer 18. The trunk lining 10 may then enter a die or mold 200. The die or mold 200 applies pressure to the trunk lining 10 and forms the trunk lining 10 shape. The plastic that forms the second layer 18 of the trunk lining 10 may partially melt during forming due to the pressure of the die or mold 200. One die or mold 200 may form the trunk lining 10. A second die or mold 200 may then cut the formed trunk lining 10. In one embodiment, a single die or mold 200 both forms and cuts the trunk lining 10. The trunk lining 10 may also be formed by any type of thermoforming or any other method chosen with the sound judgment of a person of skill in the art.

Numerous embodiments have been described, hereinabove. It will be apparent to those skilled in the art that the above methods and apparatuses may incorporate changes and modifications without departing from the general scope of this invention. It is intended to include all such modifications and alterations insofar as they come within the scope of the appended claims or the equivalents thereof.

We claim:

1. A vehicle comprising:
   a frame;
   a vehicle body supported to the frame and defining a locomotion compartment, a passenger compartment for use in housing associated passengers, and a trunk compartment for use in housing cargo, the trunk compartment including a trunk floor, a front border, and first and second side borders;
   a locomotion source supported to the frame and positioned substantially within the locomotion compartment;
   at least one ground engaging wheel supported to the frame and operatively connected to the locomotion source to provide locomotion for the vehicle;
   wherein the trunk compartment comprises:
      a trunk lining at least partially covering a surface of the trunk compartment, the trunk lining comprising:
         a first trunk top coat member having an inner surface that defines at least a portion of the trunk lining and an outer surface; and
         a first trunk spacer member including a first portion operatively connected to the first trunk top coat member and a second portion operatively connected to the surface of the trunk compartment, the first trunk spacer member having a first edge pivotally connected to a first edge of the first top coat member with a first hinge;
         wherein the first trunk spacer member is located between the first trunk top coat member and the surface of the trunk compartment, and wherein the first trunk top coat member covers substantially the entire first trunk spacer member;
         wherein the first trunk top coat member and the first trunk spacer member are formed in the same mold; and,
      wherein the trunk compartment is positioned outside the passenger compartment.

2. The vehicle of claim 1 wherein the first trunk top coat member and the first trunk spacer member are substantially one continuous member.

3. The vehicle of claim 2 wherein the first hinge is a living hinge.

4. The vehicle of claim 1 wherein the first trunk top coat member and the first trunk spacer member are formed of the same material.

5. The vehicle of claim 1 wherein the first trunk top coat member and the first trunk spacer member are formed of different materials.

6. The vehicle of claim 1 wherein the first trunk spacer member is formed with at least one ridge providing structural support to the first trunk spacer member.

7. The vehicle of claim 1 wherein the first trunk spacer member is formed with a plurality of ridges providing structural support to the first trunk spacer member.

8. The vehicle of claim 1 further comprising:
   a second trunk spacer member wherein a first portion of the second trunk spacer member is operatively connected to the first trunk top coat member and a second portion is operatively connected to the surface of the trunk compartment; and,
   wherein a first edge of the first trunk top coat member and a first edge of the second trunk spacer member are pivotally coupled with a second hinge allowing the second trunk spacer member to pivot about the second hinge;
   wherein the second trunk spacer member is located between the first trunk top coat member and the surface of the trunk compartment;
   wherein the first trunk top coat member covers substantially the entire second trunk spacer member;
   wherein the first trunk top coat member, the first trunk spacer member, and the second trunk spacer member are formed in the same mold.

9. The vehicle of claim 8 further comprising:
   a third trunk spacer member wherein a first portion of the third trunk spacer member is operatively connected to the first trunk top coat member and a second portion is operatively connected to the the surface of the trunk compartment; and,
   wherein a first edge of the first trunk top coat member and a first edge of the third trunk spacer member are pivotally coupled with a third hinge allowing the third trunk spacer member to pivot about the third hinge;
   wherein the third trunk spacer member is located between the first trunk top coat member and the surface of the trunk compartment;
   wherein the first trunk top coat member covers substantially the entire third trunk spacer member;
   wherein the first trunk top coat member, the first trunk spacer member, the second trunk spacer member, and the third trunk spacer member are formed in the same mold.

10. The vehicle of claim 9 wherein the first, second, and third hinges are living hinges.

11. The vehicle of claim 1 further comprising:
    a second trunk top coat member having an inner surface that defines at least a portion of the trunk lining and an outer surface; and
    a second trunk spacer member wherein a first portion of the second trunk spacer member is operatively connected to the second trunk top coat member and a second portion is operatively connected to the surface of the trunk compartment;

wherein a first edge of the second trunk top coat member and a first edge of the second trunk spacer member are coupled with a second hinge allowing the second trunk spacer member to pivot about the second hinge;

wherein the second trunk spacer member is located between the second trunk top coat member and the surface of the trunk compartment;

wherein the second trunk top coat member covers substantially the entire second trunk spacer member;

wherein the first trunk top coat member and the second trunk top coat member are operatively connected; and, wherein the first trunk top coat member, the second trunk top coat member, the first trunk spacer member, and the second trunk spacer member are all formed in the same mold.

12. The vehicle of claim 1 wherein the first trunk spacer member is located between the first trunk top coat member and the trunk floor.

13. The vehicle of claim 9 wherein the second and third trunk spacer members are located between the first trunk top coat member and the front border.

14. A vehicle comprising:
a frame;
a vehicle body supported to the frame and defining a locomotion compartment, a passenger compartment for use in housing associated passengers, and a trunk compartment for use in housing cargo, the trunk compartment including a trunk floor, a front border, and first and second side borders;
a locomotion source supported to the frame and positioned substantially within the locomotion compartment;
at least one ground engaging wheel supported to the frame and operatively connected to the locomotion source to provide locomotion for the vehicle;
the trunk compartment comprising:
a trunk lining at least partially covering a surface of the trunk compartment, the trunk lining comprising:
a first trunk top coat member including an inner surface that defines at least a portion of the trunk lining and an outer surface; and
a first trunk spacer member including at least one ridge providing structural support, the first trunk spacer member positioned substantially between the first trunk top coat member and the surface of the trunk compartment;
wherein the first trunk top coat member covers substantially the entire first trunk spacer member;
wherein the trunk compartment is positioned outside the passenger compartment.

15. The vehicle of claim 12 wherein the first trunk spacer member is formed with a plurality of ridges providing structural support.

16. The vehicle of claim 12 wherein the first trunk top coat member and the first trunk spacer member are substantially one continuous member.

17. The vehicle of claim 12 wherein the first trunk spacer member includes a first edge pivotally connected to a first edge of the first top coat member with a hinge.

18. The vehicle of claim 12 wherein the first trunk top coat member and the first trunk spacer member are formed of the same material.

19. The vehicle of claim 12 wherein the first trunk top coat member and the first trunk spacer member are formed of different materials.

20. A vehicle comprising:
a frame;
a vehicle body supported to the frame and defining a locomotion compartment, a passenger compartment for use in housing associated passengers, and a trunk compartment for use in housing cargo, the trunk compartment including a trunk floor, a front border, and first and second side borders;
a locomotion source supported to the frame and positioned substantially within the locomotion compartment;
at least one ground engaging wheel supported to the frame and operatively connected to the locomotion source to provide locomotion for the vehicle;
wherein the trunk compartment comprises:
a trunk lining at least partially covering a surface of the trunk compartment, the trunk lining comprising:
a first trunk top coat member having an inner surface that defines at least a portion of the trunk lining and an outer surface, the first trunk top coat member covering at least a portion of the trunk floor and the front border; and
a first trunk spacer member having a first edge pivotally connected to a first edge of the first top coat member with a first hinge, wherein the first trunk spacer member is located between the first trunk top coat member and the trunk floor, and wherein the first trunk top coat member covers substantially the entire first trunk spacer member;
a second trunk spacer member having a first edge pivotally connected to a second edge of the first top coat member with a second hinge, wherein the second trunk spacer member is located between the first trunk top coat member and the front border, and wherein the first trunk top coat member covers substantially the entire first trunk spacer member;
a third trunk spacer member having a first edge pivotally connected to a third edge of the first top coat member with a third hinge, wherein the third trunk spacer member is located between the first trunk top coat member and the front border, and wherein the first trunk top coat member covers substantially the entire first trunk spacer member;
wherein the first trunk top coat member, the first trunk spacer member, the second trunk spacer member, and the third trunk spacer member are one continuous member;
wherein the trunk compartment is positioned outside the passenger compartment.

* * * * *